(12) United States Patent
Yu

(10) Patent No.: US 6,494,128 B1
(45) Date of Patent: Dec. 17, 2002

(54) INFUSING CONTAINER

(76) Inventor: Hong Chao Yu, P.O. Box 2103, Taichung (TW)

( * ) Notice: Subject to any disclaimer, the term of this patent is extended or adjusted under 35 U.S.C. 154(b) by 0 days.

(21) Appl. No.: 10/140,190

(22) Filed: May 8, 2002

(51) Int. Cl.[7] .............................. A23L 1/00; A47J 31/02
(52) U.S. Cl. .............................. 99/285; 99/297; 99/299; 99/306; 99/323; 99/495
(58) Field of Search .......................... 99/495, 452, 453, 99/285, 299, 297, 304–306, 317, 319, 279, 323, 323.3; 210/474, 477–479, 181; 426/433, 435, 432, 429

(56) References Cited

U.S. PATENT DOCUMENTS

| | | | | |
|---|---|---|---|---|
| 3,631,793 A | * | 1/1972 | Bednartz | 99/295 |
| 3,724,359 A | * | 4/1973 | Masters et al. | 99/281 |
| 5,125,327 A | * | 6/1992 | Winnington-Ingram | 99/306 |
| 5,632,193 A | * | 5/1997 | Shen | 99/285 |
| 5,632,194 A | * | 5/1997 | Lin | 99/285 |
| 5,813,317 A | * | 9/1998 | Chang | 99/285 |
| 5,913,964 A | * | 6/1999 | Melton | 99/322 |
| 5,924,354 A | * | 7/1999 | Court et al. | 99/318 |
| 5,943,946 A | * | 8/1999 | Chen | 99/297 |
| 5,947,004 A | * | 9/1999 | Huang | 99/299 |
| 6,164,190 A | * | 12/2000 | Tien Lin | 99/299 |
| 6,279,460 B1 | * | 8/2001 | Pope | 99/299 |
| 6,327,965 B1 | * | 12/2001 | Lin Tien | 99/299 |

* cited by examiner

Primary Examiner—Timothy F. Simone

(57) ABSTRACT

An infusing container including a main body, a cover and an automatically unblocking unit. The automatically unblocking unit includes a barrel body disposed in the main body. The bottom of the barrel body is formed with a draining hole accommodated in the outlet of the main body. A movable shaft is passed through the interior of the barrel body. The bottom end of the shaft is provided with a water sealing valve positioned in a water sealing section of the barrel body for blocking the draining hole. A circumference of the water sealing section is formed with orifices. The water sealing valve is formed with notches corresponding to the orifice and communicating with the interior of the barrel body. A floating body is fitted around the shaft. An upper section of the shaft is formed with an enlarged projecting section for stopping the floating body. After a liquid flows through the orifices and the notches into the barrel body, the floating body is ascended to lift the shaft. At this time, the water sealing valve is moved upward, whereby the interiors of the barrel body and the main body communicate with the draining hole, permitting the liquid in the main body to drain out from the draining hole.

4 Claims, 9 Drawing Sheets

INFUSING CONTAINER

BACKGROUND OF THE INVENTION

The present invention is related to an infusing container, and more particularly to an infusing container which can automatically open the valve body to drain the liquid. The time taken for automatically opening the valve body is adjustable so as to prevent the infused material from being soaked too long.

FIG. 8 shows a conventional infusing container 8 composed of a cup body 81, a filtering mesh 82 and a holding tray 83. The filtering mesh 82 is disposed in the cup body 81. The cup bottom 811 is conic and formed with a central through hole 812. A valve body 84 drops due to its own weight to block the through hole 812. The holding tray 83 is up and down movably fitted on the lower section of the cup body 81. The holding tray 83 is hollow and has a cross-shaped rib 831. The center of the rib 831 is formed with a socket 832 in which a downward extending post 841 of the valve body 84 is inserted. When the holding tray 83 is lifted, via the post 841 the valve body 84 is pushed upward to unblock the through hole 812. At this time, the liquid in the cup body 81 can be drained out through the through hole 812.

When using such tea-infusing container, a user has to judge the soaking time. After the user infuses the tea in the cup body 81 with hot water, the user needs to wait for a certain period of time to soak and spread the tea. Thereafter, the user puts the cup body 81 at the opening of a cup 9 as shown in FIG. 9. The holding tray 83 is pressed upward to push away the valve body 84. At this time, the made tea in the cup body 81 can flow through the through hole 812 and fall into the cup 9. However, in case the user temporarily leaves or is busy and forgets to watch the soaking time, the tea will be soaked too long in the cup body 81. As a result, the tea will become bitter and astringent.

SUMMARY OF THE INVENTION

It is therefore a primary object of the present invention to provide an infusing container including a main body, a cover and an automatically unblocking unit. The automatically unblocking unit includes a barrel body. The bottom of the barrel body is formed with a draining hole. A movable shaft is passed through the interior of the barrel body. The bottom end of the shaft is provided with a water sealing valve positioned in a water sealing section of the barrel body for blocking the draining hole. A circumference of the water sealing section is formed with orifices. The water sealing valve is formed with notches corresponding to the orifice and communicating with the interior of the barrel body. A floating body is fitted around the shaft. An upper section of the shaft is formed with an enlarged projecting section for stopping the floating body. After a liquid flows through the orifices and the notches into the barrel body, the floating body is ascended to drive and lift the shaft. At this time, the water sealing valve is moved upward, whereby the interior of the main body communicate with the draining hole, permitting the liquid in the main body to drain out from the draining hole. Accordingly, the water sealing valve can be automatically opened.

It is a further object of the present invention to provide the above infusing container in which a user can turn the shaft to drive and rotate the water sealing valve so as to selectively aim the notches thereof at a different number of orifices of the water sealing section. Accordingly, the ascending time of the floating body can be changed so as to adjust the time taken for automatically opening the water sealing valve.

The present invention can be best understood through the following description and accompanying drawings wherein:

DETAILED DESCRIPTION OF THE PREFERRED EMBODIMENT

Figure 1:
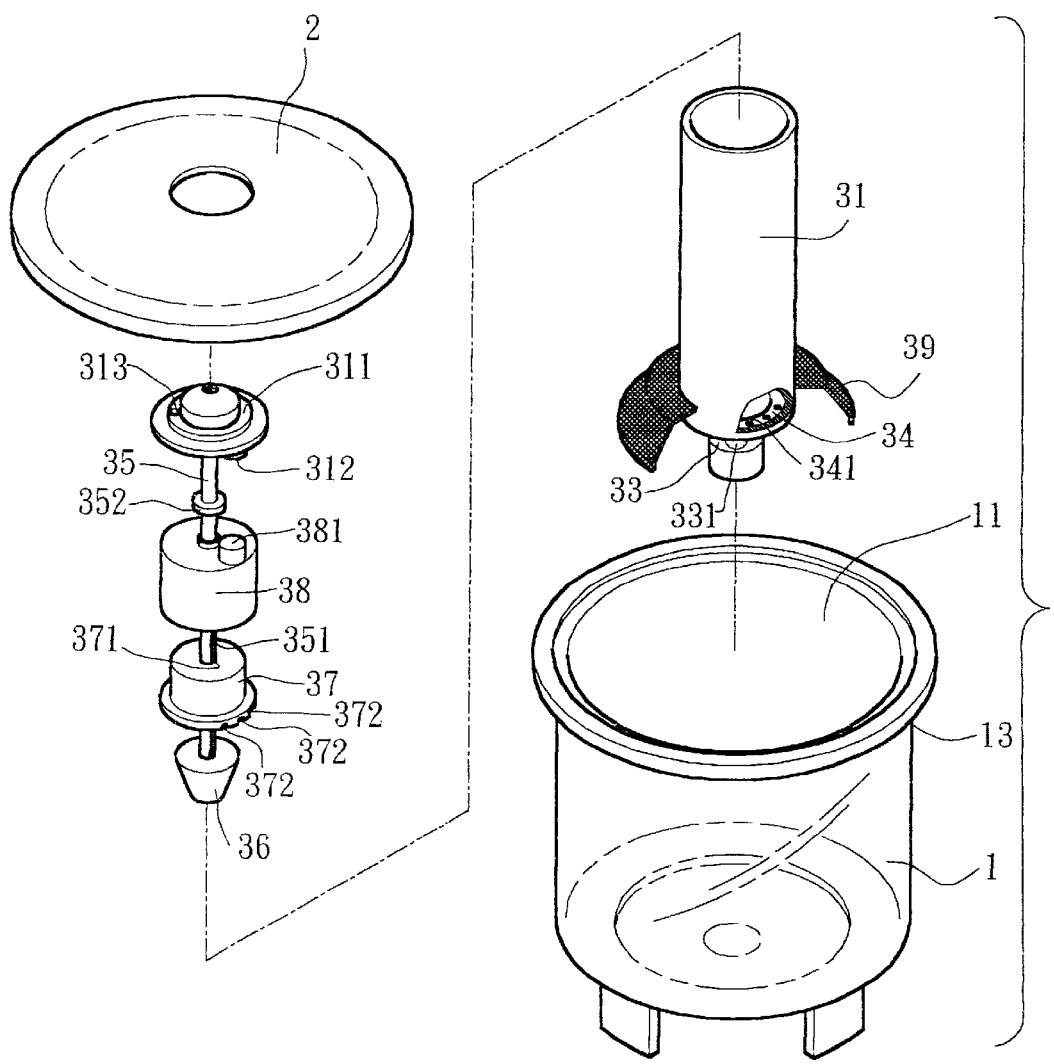
FIG. 1 is a perspective exploded view of the present invention.
Figure 2:
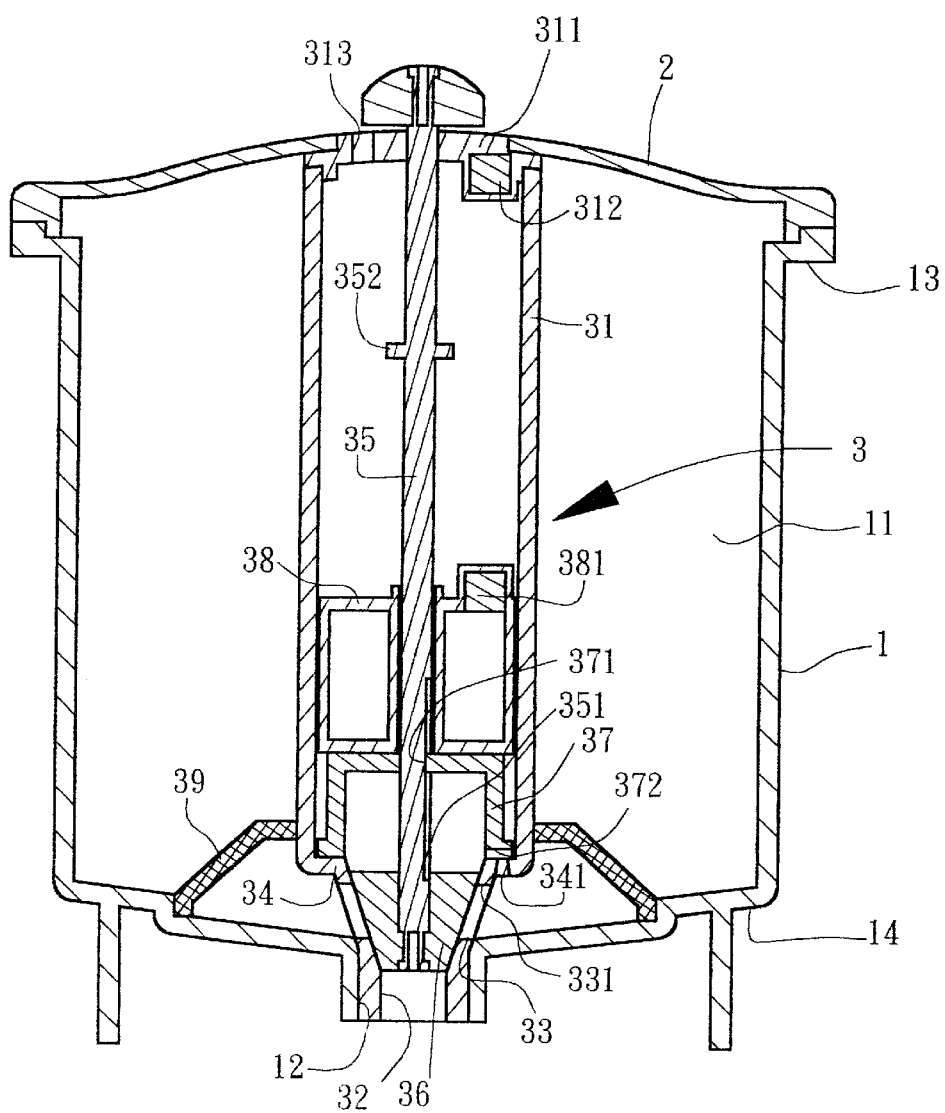
FIG. 2 is a sectional assembled view of the present invention.
Figure 3:
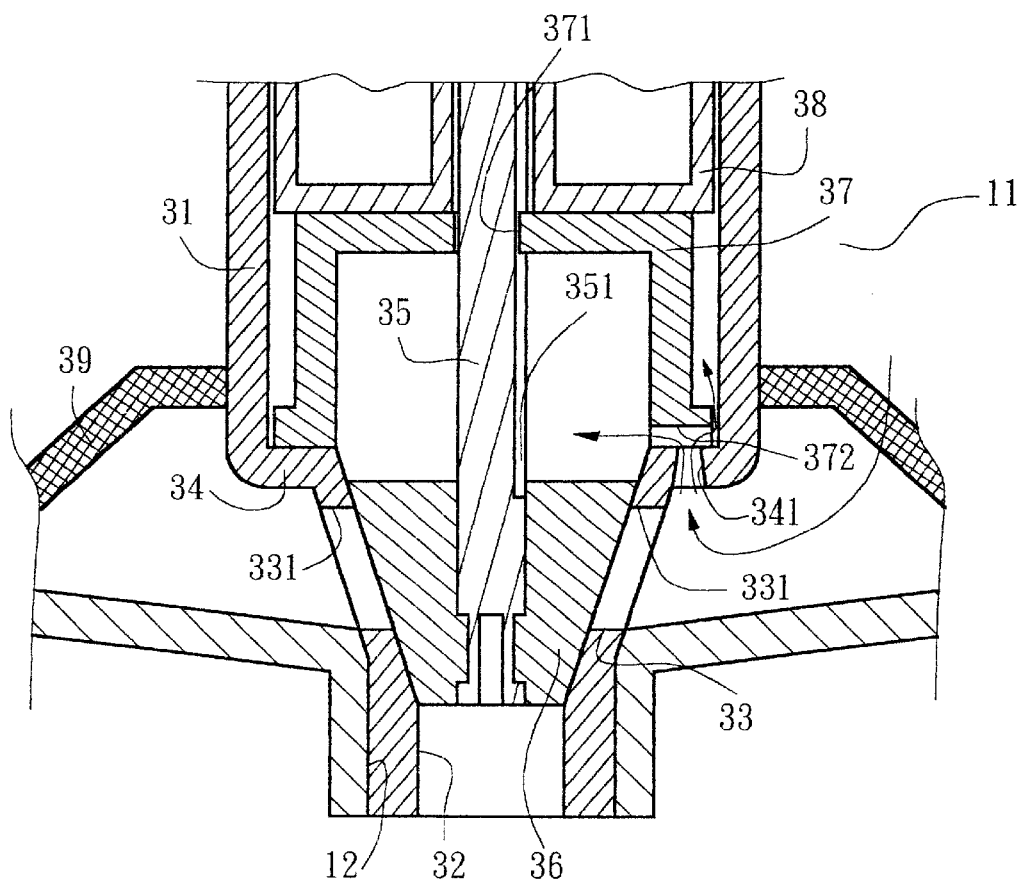
FIG. 3 is an enlarged sectional view showing the bottoms of the barrel body and the main body of the present invention.

Please refer to FIGS. 1 to 6. The infusing container of the present invention includes a main body 1, a cover 2 and an automatically unblocking unit 3.

The main body 1 defines an internal space 11 with an upper opening. The bottom of the main body 1 is formed with an outlet 12. The circumferences of the upper and lower sections of the main body 1 are respectively formed with two annular stop sections 13, 14.

The cover 2 is laid on the upper end of the main body 1 to seal the upper opening thereof.

The automatically unblocking unit 3 includes a barrel body 31 disposed in the main body 1. The bottom end of the barrel body 31 is formed with a draining hole 32 accommodated in the outlet 12 of the main body 1. A conic section 33 is formed above the draining hole 32. The conic section 33 has a water sealing section 34 adjacent to the barrel body 31. A movable shaft 35 is passed through the interior of the barrel body 31. The bottom end of the shaft 35 is provided with a water sealing valve 36 having a shape complementary to the inner circumference of the conic section 33. A lower section of the shaft 35 is formed with an axially extending channel 351. A water sealing cap 37 is fitted around the shaft 35. The water sealing cap 37 is made of a material with a specific weight greater than that of water. The water sealing cap 37 is formed with a projection 371 corresponding to the channel 351 of the shaft 35 for restricting the water sealing cap 37 from rotating relative to the shaft 35. The outer diameter of the water sealing cap 37 is slightly smaller than the inner diameter of the barrel body 31. The circumference of the conic section 33 is formed with multiple inlets 331. The water sealing section 34 is formed with multiple orifices 341. The water sealing cap 37 is formed with multiple notches 372 corresponding to the orifices 341 and communicating with the interior of the barrel body 31. The liquid can only flow through the notches 372 into the interior of the barrel body 31, while being unable to flow out through the draining hole 32. An up and down movable floating body 38 is fitted around the shaft 35. A magnet 381 is disposed on top face of the floating body 38. An upper section of the shaft 35 is formed with an enlarged projecting section 352 with larger diameter for stopping the floating body 38. Another magnet 312 is disposed under inner face of a top cap 311 of the barrel body 31 for attracting the magnet 381 of the floating body 38. The top cap 311 is formed with a vent 313. A filtering mesh 39 is laid between the lower section of the barrel body 31 and the inner face of the bottom of the main body 1 to prevent alien article such as tea from flowing to the bottom of the barrel body 31 and blocking the respective flow ways thereof.

Figure 4:
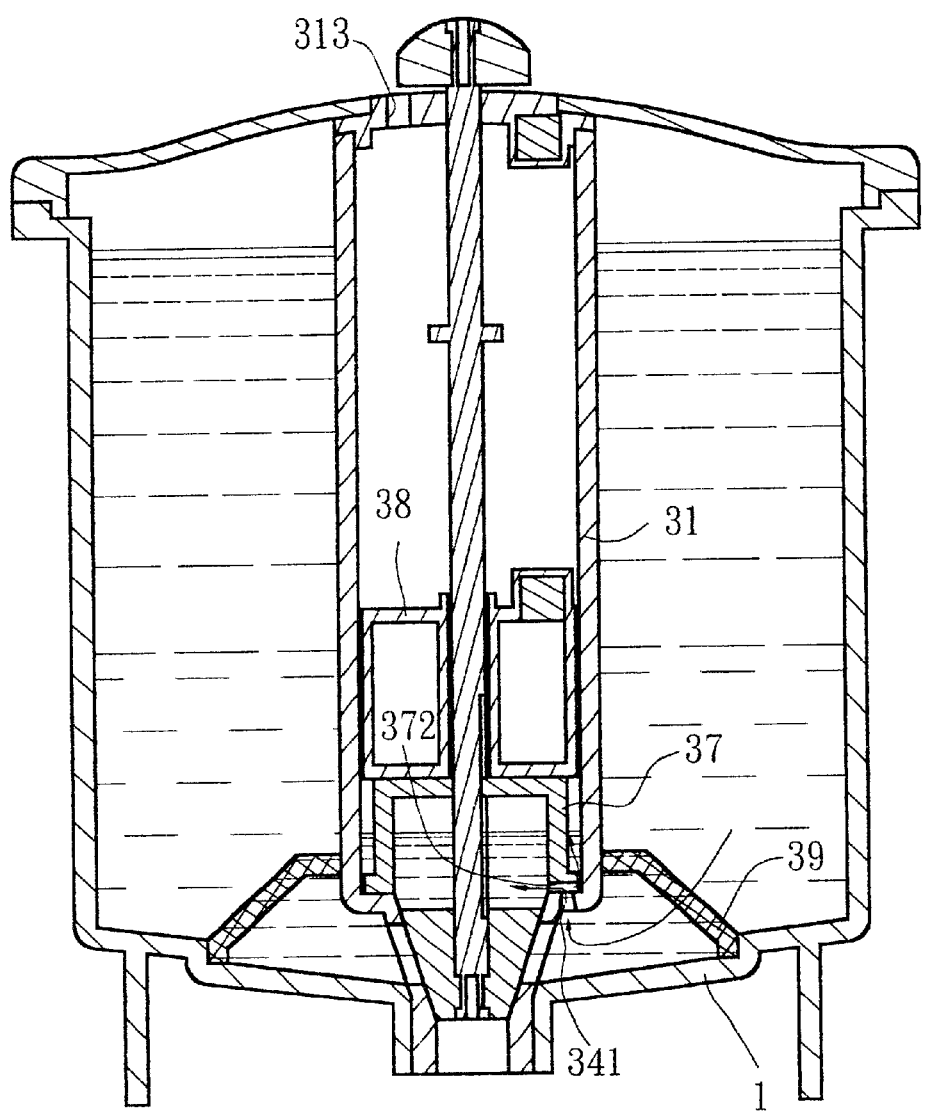
FIG. 4 shows the use of the present invention in a first state.
Figure 5:
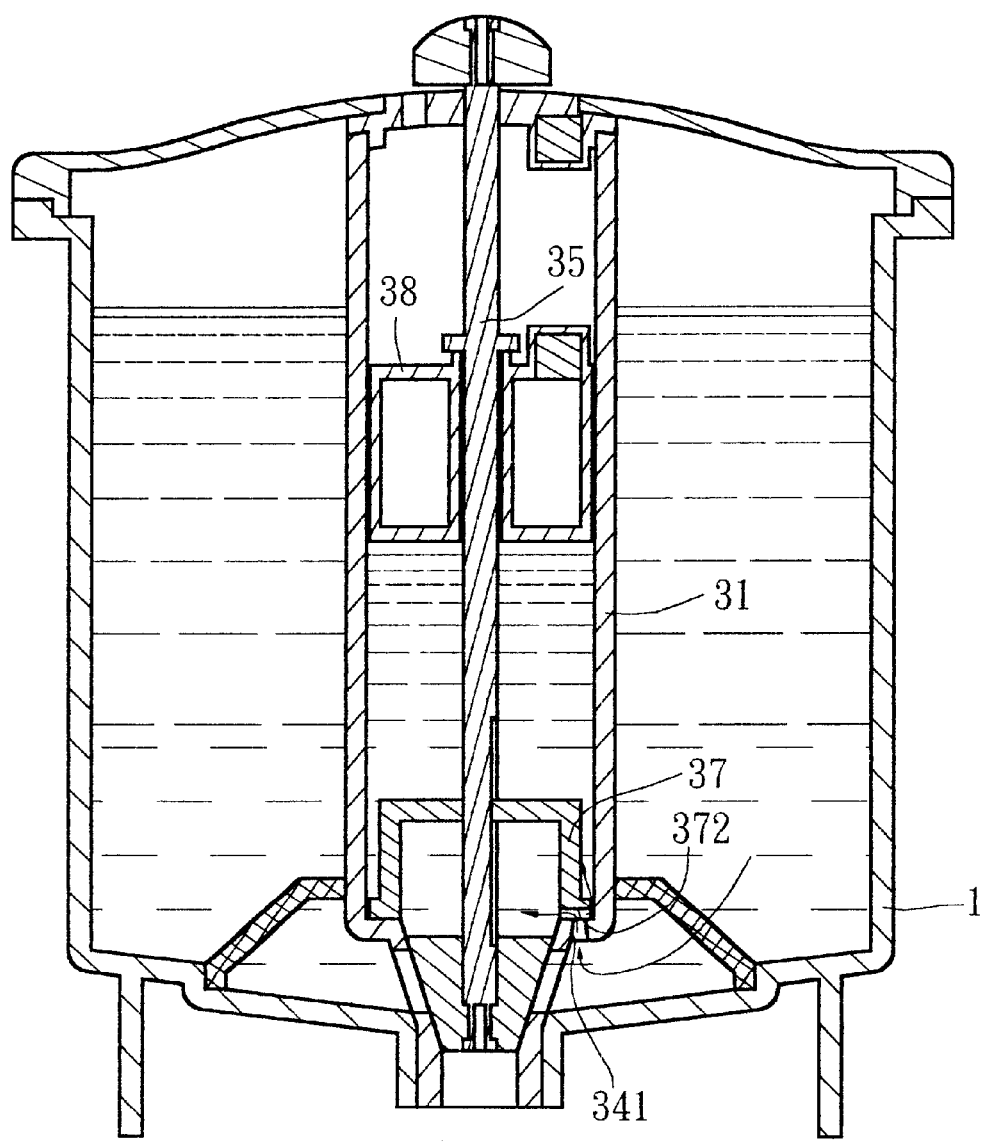
FIG. 5 shows the use of the present invention in a second state.
Figure 6:
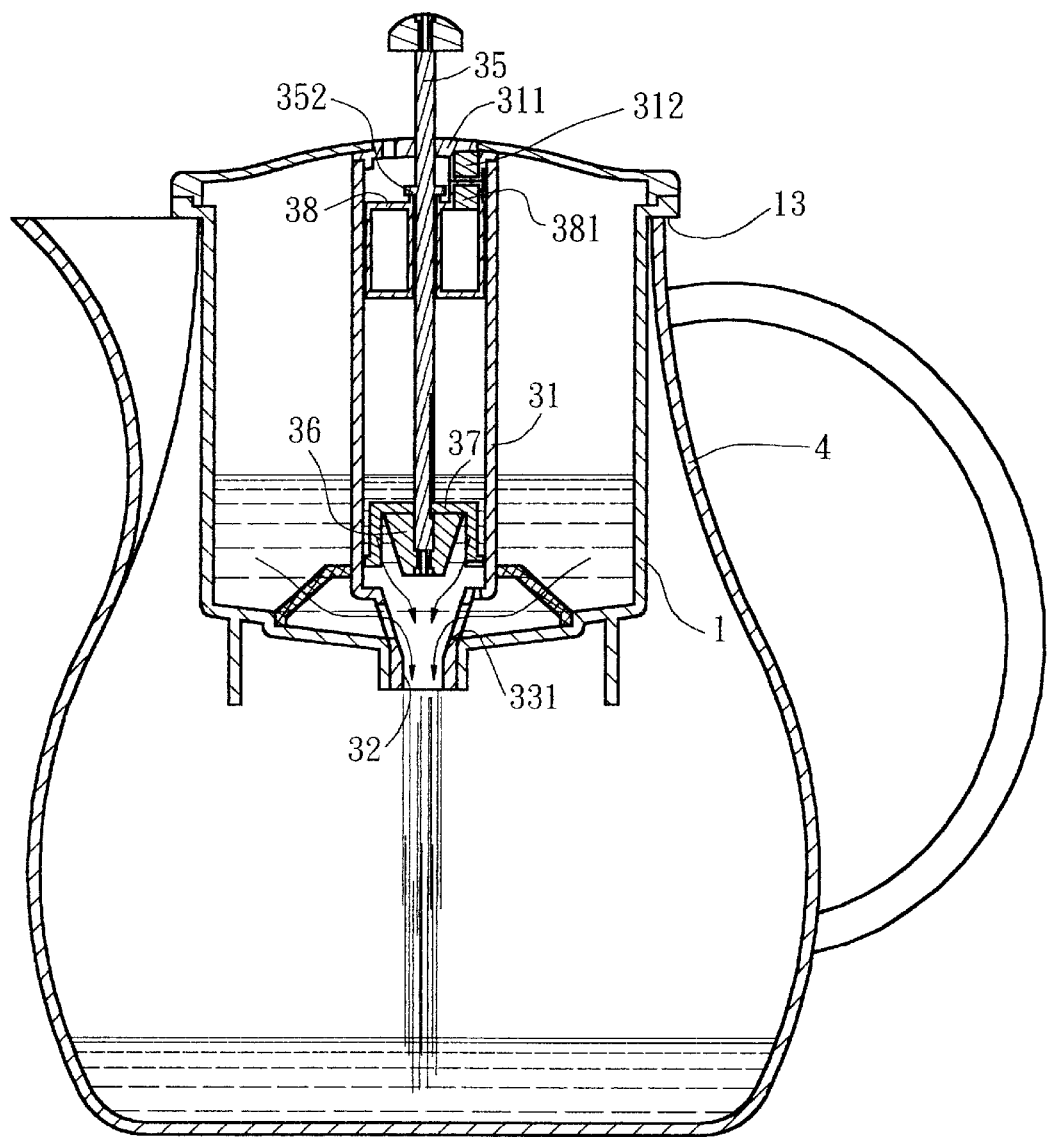
FIG. 6 shows the use of the present invention in a third state.
Figure 7A:
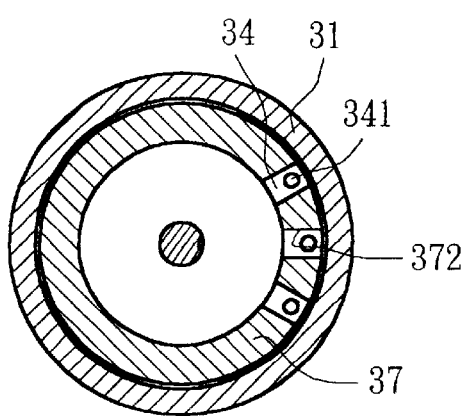
FIG. 7A shows that the water sealing cap is turned to a position where the orifices of the water sealing section are all unblocked.
Figure 7C:
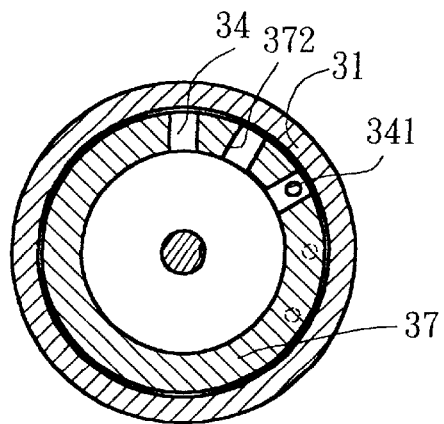
FIG. 7C shows that the water sealing cap is turned to a position where only one of the orifices of the water sealing section is unblocked.
Figure 7B:
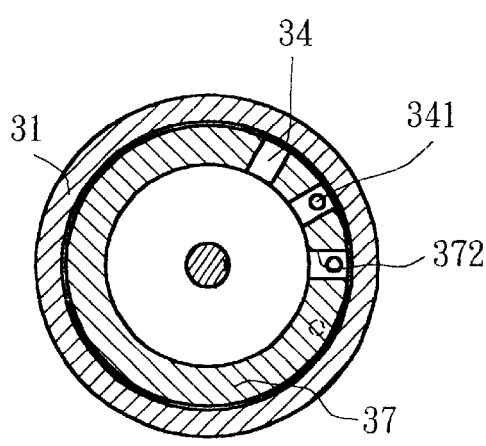
FIG. 7B shows that the water sealing cap is turned to a position where some of the orifices of the water sealing section are unblocked.
Figure 7D:
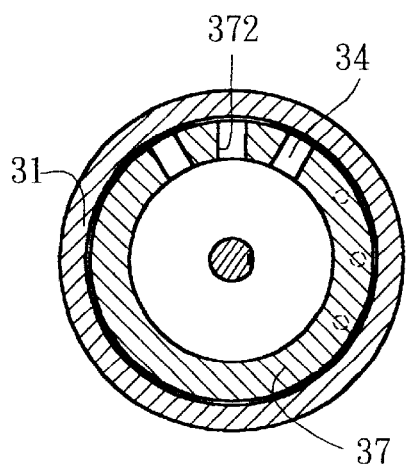
FIG. 7D shows that the water sealing cap is turned to a position where the orifices of the water sealing section are all blocked.
Figure 8:
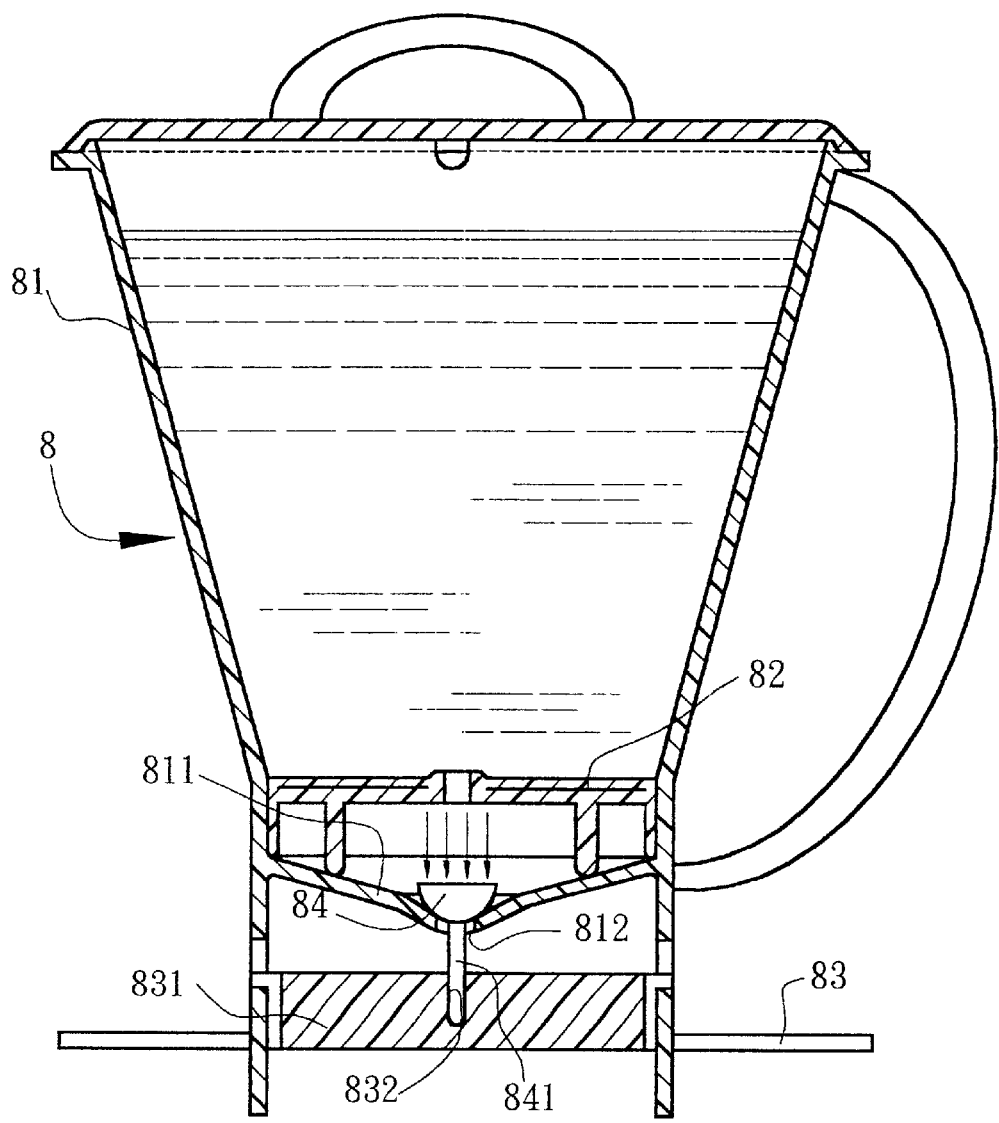
FIG. 8 shows a conventional infusing container.
Figure 9:
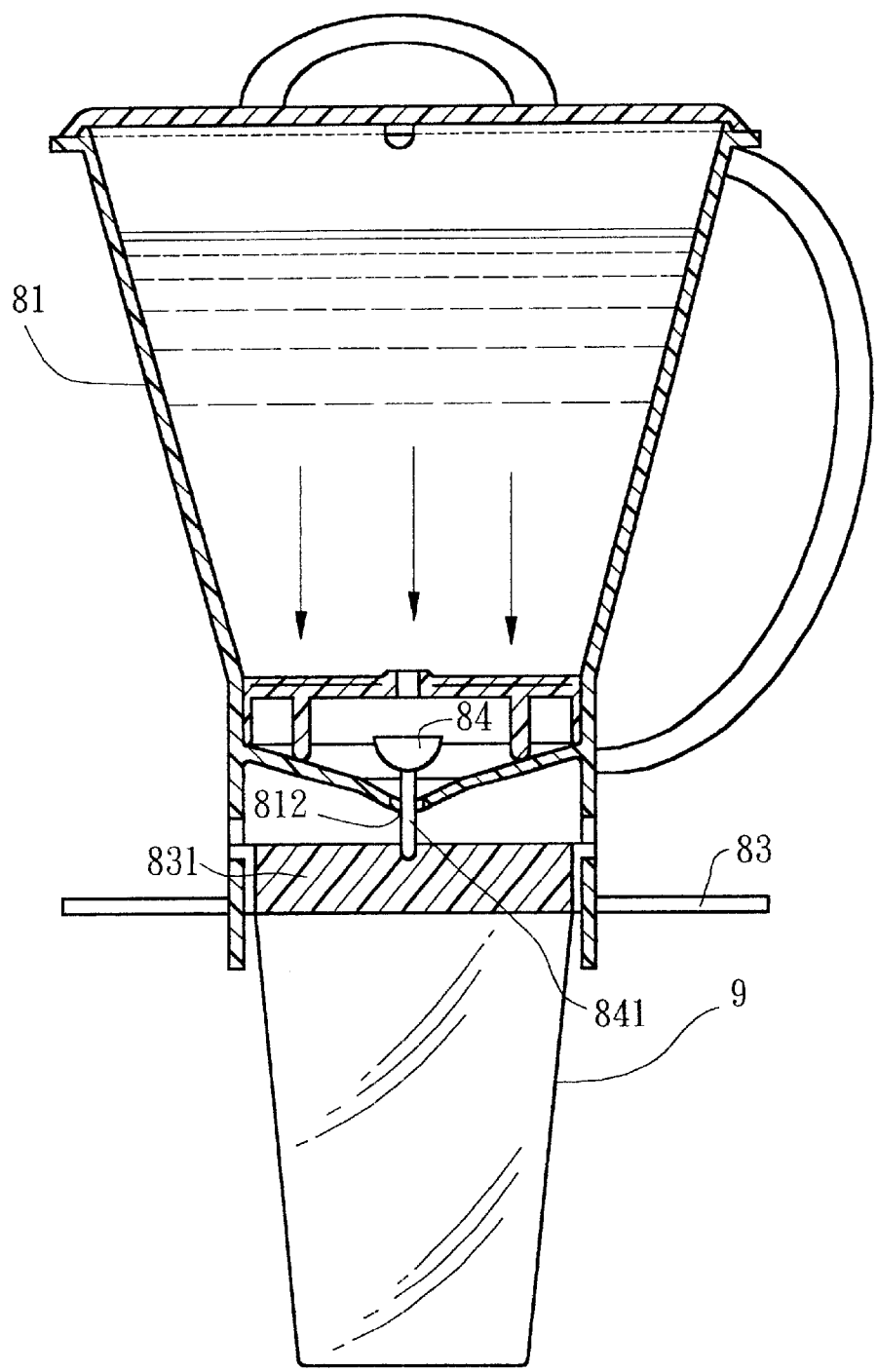
FIG. 9 shows the use of the conventional infusing container.

Referring to FIGS. 4 to 6, in use, the main body 1 is placed on a pot or a cup with the stop section 13 or 14 retained on the circumference of the opening of the pot or cup. In this embodiment, the main body 1 is placed on a pot 4 with the stop section 13 retained on the circumference of the opening of the pot 4. Then a material such as tea is put into the main body 1 to be infused. By means of turning the shaft 35, the water sealing cap 37 is driven and rotated to aim the notches 372 of the water sealing cap 37 at the orifices 341 of the water sealing section 34. In this embodiment, the barrel body 31 is made of transparent material so that a user can clearly see the position of the water sealing cap 37. Then, hot water is poured into the main body 1. As necessary, the user can selectively aim the notches 372 at all the orifices 341 or some of the orifices 341 so as to change the number of the free orifices 341. The liquid in the main body 1 flows through the orifices 341 and the notches 371 into the barrel body 31. All the orifices 341 and the notches 372 are designed with quite small cross-sectional area so that the liquid will slowly flow into the barrel body 31 as shown in FIG. 4. The draining hole 32 is blocked by the water sealing valve 36 so that the level of the liquid in the barrel body 31 will ascend with time as shown in FIG. 5. When the level of the liquid in the barrel body 31 reaches a certain height where the floating body 38 abuts against the projecting section 352 of the shaft 35, the magnet 381 on the top face of the floating body 38 and the magnet 312 under the top cap 311 of the barrel body 31 will attract each other. By means of the magnetic attraction, an increased lifting force is applied to the floating body 38, whereby the floating body 38 via the projecting section 352 drives the shaft 35 to move upward. At this time, the water sealing valve 36 is extracted from the conic section 33 and the water sealing cap 37 is driven to upward separate from the water sealing section 34. Under such circumstance, a free passage is formed between the interior of the barrel body 31 and the inlets 331 and the draining hole 32, permitting the tea in the main body 1 to drain out from the draining hole 32 and fall into the pot 4 as shown in FIG. 6. Accordingly the water sealing valve 36 can be automatically opened at fixed time to drain out the tea from the main body 1. Therefore, the tea will not be soaked too long and become astringent. Furthermore, if necessary, the user can turn the shaft 35 to disalign the notches 372 of the water sealing cap 37 from all the orifices 341 of the water sealing section 34. Accordingly, the orifices 341 are all blocked and the water sealing valve 36 will not be automatically opened.

According to the above arrangement, by means of changing the position of the notches 372 of the water sealing cap 37, the number of unblocked orifices 341 of the water sealing section 34 can be adjusted to control the flow of the liquid flowing into the barrel body 31. After the liquid flows through the orifices 341 and the notches 372 into the barrel body 31, the floating body 38 fitted around the shaft 35 will ascend. When the floating body 38 reaches a certain height, the magnet 381 of the floating body 38 and the magnet 312 of the top cap 311 of the barrel body 31 will attract each other. Under such circumstance, the floating body 38 via the enlarged projecting section 352 of the shaft 35 drives the shaft 35 to move upward. At this time, the water sealing valve 36 is extracted from the conic section 33, whereby the interior of the barrel body 31 and the inlets 331 of the conic section 33 communicate with the draining hole 32, permitting the tea in the main body 1 to drain out from the draining hole 32. Accordingly the water sealing valve 36 can be automatically opened at fixed time.

Referring to FIGS. 7A to 7D, a user can turn the shaft 35 to drive and rotate the water sealing cap 37 so as to selectively aim the notches 372 of the water sealing cap 37 at different number of orifices 341 of the water sealing section 34. Accordingly, the flow of the liquid flowing into the barrel body 31 is adjustable so as to change the time taken for automatically opening the water sealing valve 36. Therefore, the soaking time of the tea can be adjusted according to personal desire to make thick or light tea.

The above embodiment is only used to illustrate the present invention, not intended to limit the scope thereof. Many modifications of the above embodiment can be made without departing from the spirit of the present invention.

What is claimed is:

1. An infusing container comprising:
  a main body defining an internal space with an upper opening, a bottom of the main body being formed with an outlet;
  a cover laid on the upper end of the main body to seal the upper opening thereof; and
  an automatically unblocking unit including a barrel body disposed in the main body, a bottom end of the barrel body being formed with a draining hole accommodated in the outlet of the main body, a water sealing section being formed above the draining hole, a circumference of the water sealing section being formed with more than one orifice, a movable shaft being passed through the interior of the barrel body, a bottom end of the shaft being provided with a valve body having a shape complementary to the shape of inner circumference of the water sealing section for blocking the draining hole, the valve body being formed with a notch corresponding to the orifice and communicating with the interior of the barrel body, whereby a liquid can only flow through the notch into the interior of the barrel body, while being unable to flow to the draining hole, an up and down movable floating body being fitted around the shaft, an upper section of the shaft being formed with an enlarged projecting section with larger diameter for stopping the floating body.

2. The infusing container as claimed in claim 1, further comprising a filtering mesh laid between the lower section of the barrel body and the inner face of the bottom of the main body to prevent alien article from flowing into and blocking the flow ways of the barrel body and the main body.

3. The infusing container as claimed in claim 1, wherein the barrel body has a conic section formed between the draining hole and water sealing section of the barrel body, a circumference of the conic section being formed with more than one inlet, a bottom end of the shaft extending to the conic section of the barrel body and being provided with a water sealing valve having a shape complementary to the inner circumference of the conic section.

4. The infusing container as claimed in claim 1, wherein the outer circumference of the main body is formed with more than one annular stop section, a top cap of the barrel body being formed with more than one vent, a magnet being disposed on top face of the floating body, another magnet being disposed under inner face of the top cap of the barrel body, the two magnets serving to attract each other.

\* \* \* \* \*